Figure 1:
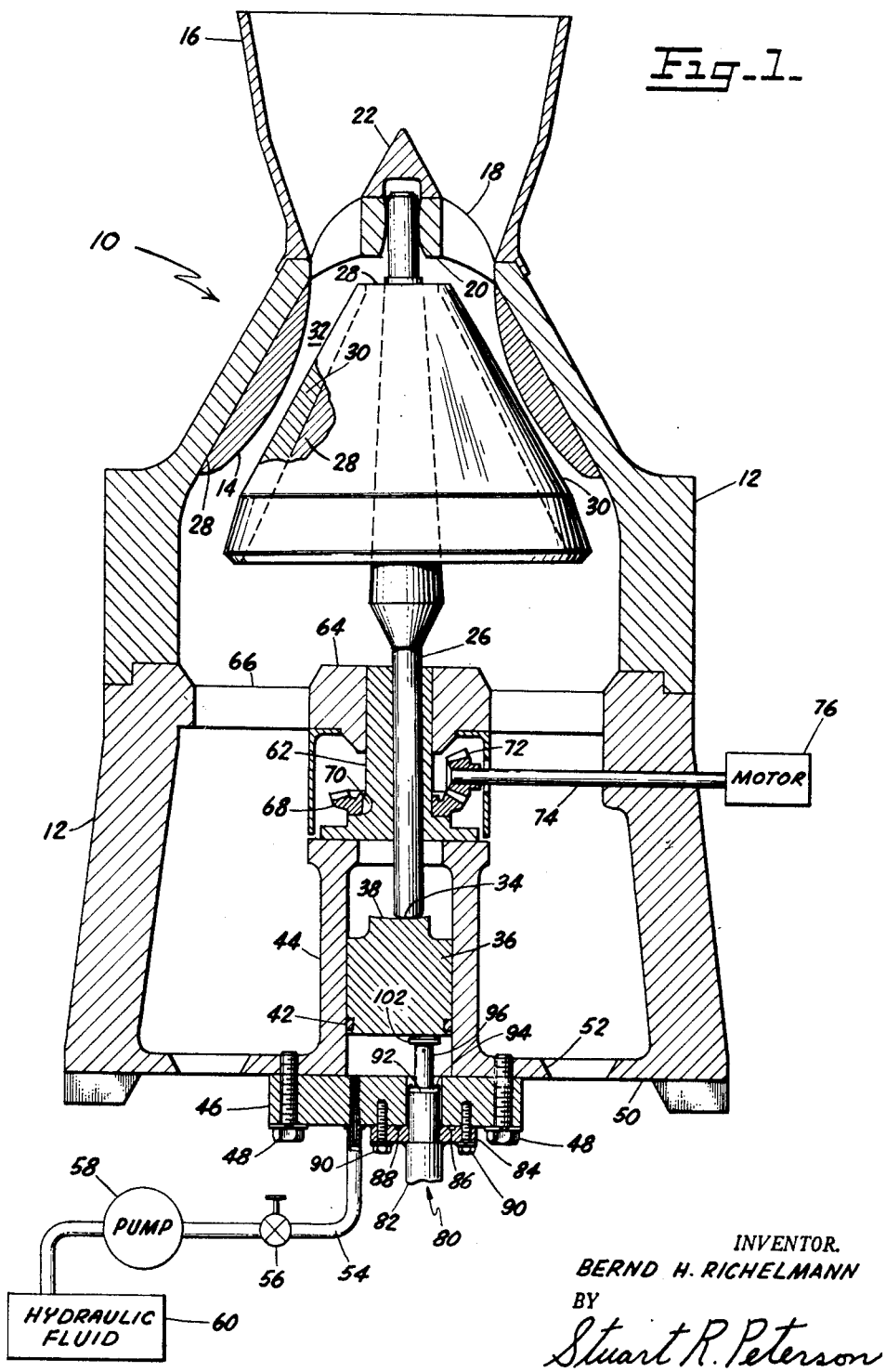

Sept. 22, 1964

B. H. RICHELMANN 3,149,791

POSITION INDICATING TRANSMITTER

Filed Feb. 19, 1962

2 Sheets-Sheet 1

INVENTOR.
BERND H. RICHELMANN
BY
Stuart R. Peterson
ATTORNEY

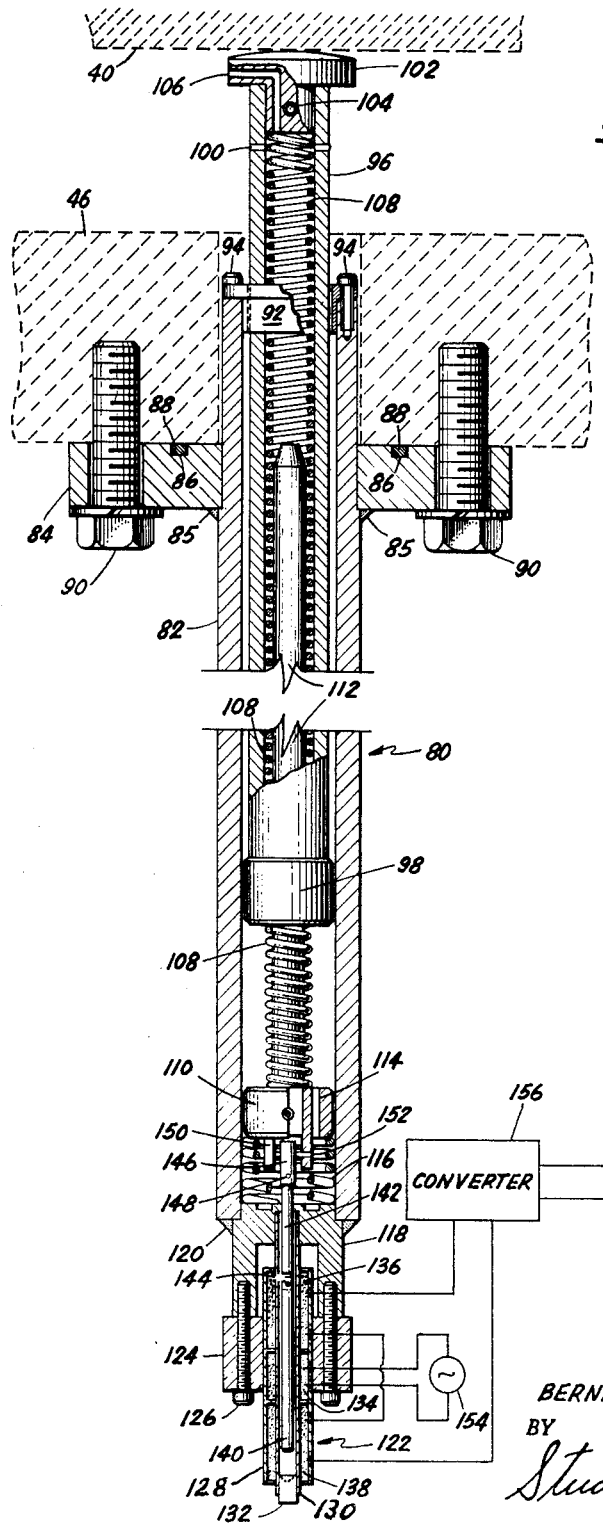

United States Patent Office 3,149,791
Patented Sept. 22, 1964

3,149,791
POSITION INDICATING TRANSMITTER
Bernd H. Richelmann, St. Paul, Minn., assignor to Ramsey Engineering Company, a corporation of Minnesota
Filed Feb. 19, 1962, Ser. No. 174,139
10 Claims. (Cl. 241—101)

This invention relates generally to position indicators, and pertains more specifically to a transmitter for indicating the level of a mantle employed in crushing apparatus.

One object of the invention is to provide a transmitter for indicating the position of a shiftable member where the member is to be moved through distances of appreciable length. The invention has for an aim the reduction of the displacement or movement to such an extent that a conventional differential transformer may be used as the means for generating a signal which is in accordance with the displacement of the shiftable member. In other words, it is within the purview of the invention to reduce a given movement of a member to a fraction of its actual movement, thereby facilitating the instrumentation by which the position of such member is denoted.

Another object of the invention is to provide a transmitter for indicating the position of a movable member that can be employed in relatively inaccessible places where direct human observation or measurement is virtually impossible.

A further object is to provide a transmitter of the foregoing character that can be employed where rather high fluid pressures are used.

Yet another object of the invention is to provide a transmitter capable of indicating the position of a member that is quite accurate, reliable, long-lasting, and which will require very little maintenance. With respect to the latter quality of the device, it is to be noted that no sliding contact is employed in conjunction with the electrical device for generating the signal which is indicative of the shiftable member's position.

The invention is believed to have especial utility in connection with large and massive crushing apparatus. One type of such apparatus has been used in ore processing, the crushing apparatus including a cone or mantle which is moved about or oscillated within a housing so as to crush the ore as it passes between the mantle and housing. Due to the need for size control, release of uncrushable objects plus the fact that the cone or mantle and the cooperating ring concave are subjected to appreciable wear, it has become necessary in practice to provide for moving the mantle vertically. Because the crushing apparatus is usually quite large, the upward adjustment or shifting can amount to as much as two feet. The upward adjustment is usually effected hydraulically, and the present invention contemplates the use of a transmitter capable of following the piston within the hydraulic cylinder. By producing a signal in accordance with the position of the piston, the level of the mantle is thereby indicated.

Briefly, the invention utilizes a pair of coil springs mounted in tandem or series. These springs have a different strength or spring rate, the spring rate of a spring being the load or applied pressure per unit of deflection, and the spring of greater strength has connected thereto a differential transformer. Thus, when the spring of lesser strength is acted upon by the member, the position of which is to be indicated, the coil spring of lesser strength is expanded or compressed, as the case may be, considerably more than the spring of greater strength. Therefore, the core of the differential transformer is moved only a fraction of the distance the member to be tracked is moved.

These and other objects and advantages of this invention will more fully appear from the following description, made in connection with the accompanying drawings, wherein like reference characters refer to the same or similar parts throughout the several views and in which:

FIGURE 1 is a longitudinal sectional view of one type of crushing apparatus with which my invention will find utility, only a small portion of the position indicating transmitter being shown at the bottom in this view; and FIGURE 2 is an elevational view of the transmitter itself, largely in section, with two portions of the crushing apparatus of FIG. 1 being shown in phantom outline.

Referring now in detail to FIG. 1, the crushing apparatus there selected to illustrate the invention constitutes crushing apparatus denoted generally by the numeral 10. This apparatus includes a housing 12 which may be constructed in various sections, but which for simplicity has been shown as comprised of only two parts. Within the upper region of the housing 12 is mounted what is commonly termed a ring concave 14 which can be replaced when it becomes sufficiently worn. Surmounting the housing is a hopper 16 via which the ore to be crushed is delivered to the housing 12. At the upper end of the housing 12 is a spider 18 formed from a plurality of angularly disposed struts which provide voids therebetween for the passage of the ore aggregate. The spider 18 supports a bearing 20 over which is placed a bearing cap 22. It will be appreciated that the bearing 20 will normally be constructed with the suitable liner; however, the drawing has been simplified somewhat by showing only the more basic structure constituting the apparatus 10.

A main shaft 26 has its upper end received in the bearing 20. A portion of the shaft 26 is of a tapered configuration so as to support a conical center head 28. As is customary in equipment of this kind, the center head 28 has a mantle 30 extending thereabout which as with the ring concave 14, can be replaced after it has been worn to an extent justifying the replacement. Between the ring concave 14 and the mantle 30 is a crushing chamber 32 through which the ore aggregate passes as it is being crushed by the relative movement of the mantle 30 relative to the concave 14.

It will be observed that the lower end on the shaft 26 is of convex configuration, this end being denoted by the reference numeral 34. A piston 36 is employed for raising the shaft 26 as the ring concave 14 and mantle 30 become worn. Accordingly, the piston 36 is provided with a concave seat 38. In practice, the seat 38 would be replaceable, and the end 34 would also be provided with a detachable element; however, the drawing is believed ample for a ready understanding of the equipment with which my invention will find particular usefulness. The piston 36 has suitable packing 42 associated therewith to prevent the escape of hydraulic fluid past the piston.

The cylinder for the piston 36 has been given the reference numeral 44. Once again, for simplicity, the cylinder 44 has been shown as integral with the housing 12. Attached to the lower end of the cylinder 44 is an end plate 46, the attachment being through the agency of a plurality of bolts 48. The bolts 48, as shown, secure the plate 46 to the bottom 50 of the housing 12, there being openings 52 for the crushed material to pass through.

For the purpose of elevating the piston 36 is a hydraulic fluid line 54. In this line 54 is a control valve 56 which controls the discharge from a pump 58. The pump 58 is connected to a sump 60 containing a supply of hydraulic fluid. Depending upon the pressure of the hydraulic fluid admitted beneath the piston 36, it will be seen that the level of the head 38 and its encircling mantle 30 can be adjusted. As the ring concave 14 and mantle 30 wear, the hydraulic pressure will be increased so as to raise the piston 36 and hence the head 28 and its mantle 30 to prevent the crushing chamber from becoming too large.

The actual crushing of the ore as it passes through the chamber 32 is accomplished by oscillating the shaft 26. This is achieved by means of an eccentric bushing 62 having an offset and slightly angled bore. The bushing 62 is slidably supported on the upper flange of the cylinder 44. Hereagain, a suitable bearing liner material would be used, but for the sake of simplicity, it has not been shown. The bushing 62 is received in a bearing 64 which is a part of a second spider 66, the crushed material passing through the struts constituiting the spider 66. The eccentric bushing 62 has a beveled ring gear 68 circumscribed thereabout, a key 70 preventing relative movement between the ring gear 68 and the bushing 62. A beveled pinion 72 is in mesh with the ring gear 68. The pinion 72 is carried at one end of the drive shaft 74 which is rotated by a motor 76. Thus, the rotation of the eccentric bushing 62 is responsible for oscillating the shaft 26 and in turn the mantle 30. It will be appreciated that the lower end 34 of the shaft is moved in a circle whereas the upper end is constrained by the bearing 20. Close inspection of FIG. 1 will show that the crushing chamber 32 is narrower at the right than it is at the left. This is due to the rotative position in which the eccentric 62 has been illustrated. When the eccentric 62 has been rotated through 180 degrees, the more constricted side will then appear on the left rather than the right.

Having presented the foregoing information, it is believed that the need for a device capable of indicating the level of the mantle 30 is quite important. It should be readily apparent that there is actually no practical exterior point that can be used to indicate the height of the mantle 30. Accordingly, the transmitter for indicating the level of the mantle has been designated generally by the reference numeral 80. Only a fragment of the transmitter 80 appears in FIG. 1, but a sufficient number of parts have there been presented so as to orient the reader as far as the more detailed view of the transmitter appearing in FIG. 2 is concerned.

At any rate, it will be discerned that the transmitter 80 includes a cylindrical casing 82 having a mounting flange 84 fixedly circumscribed thereabout, as by welding at 85. The mounting flange 84 is formed with an angular groove 86 for the accommodation of suitable packing 88. Anchor bolts 90 serve as the means for attaching the flange 84 to the under side of the end or cylinder plate 46.

At the upper end of the cylindrical casing 82 is a bushing 92 held in place by bolts 94. A tubular plunger 96 is guided at its upper end by the bushing 92 and is guided at its lower end by a collar 98 which is fixedly attached to the plunger. Oil holes 100 extend radially inwardly through the plunger walls so as to permit hydraulic fluid to flow into the interior of the plunger for purpose of pressure equalization. Affixed to the upper end of the plunger 96 is a cap 102, a pin 104 securing the cap to the plunger 96. A passage 106 provides additional communication between the cylinder 44 and the interior of the tubular plunger 96.

From FIG. 2, it can be seen that a relatively long coil spring 108 having a comparatively low strength or spring rate has its upper portion disposed within the confines of the tubular plunger 96. As will become more apparent as the description progresses, the greater the spring strength the less will be its deflection for a given load. As hereinbefore mentioned, the spring rate may be considered to be the load or applied pressure per unit of spring deflection. While the upper section of the spring 108 is received within the tubular plunger 96, the lower end thereof projects beneath the end of the plunger. The lower end of the spring 108 bears directly against a cylindrical clevis member 110. The clevis member carries an upwardly directed guide rod 112 which extends within the coil spring 108. Thus, whereas the upper region of the spring 108 is adequately constrained against unwanted bending by the walls of the plunger 96, the guide rod performs a similar function for the section of spring that extends beneath the plunger. The clevis member 110 is formed with oil passages 114 so that the hydraulic fluid entering the openings 100 or the passage 106 is permitted to occupy the space beneath the clevis member 110.

A much shorter coil spring 116 is employed in a series or tandem relationship with the first spring 108. The spring 116 has a comparatively large strength or spring rate with respect to that of the spring 108. A bottom closure 118, which is welded to the cylindrical casing 82 at 120, absorbs any downward reaction of the spring 116. Consequently, when the spring 108 is either compressed or expanded considerably, the spring 116 will be compressed or expanded only slightly.

Because the length of the spring 116 is changed only slightly for a larger amount of compression of the spring 108, use can be made of a differential transformer assembly 122 of conventional construction. This assembly is attached to the bottom closure 118 by a supporting member 124 through the agency of bolts 126. The assembly 122 includes a transformer jacket 128 fixedly carried within the member 124 and a non-magnetic tube 130 of stainless steel having a plug 132 brazed or welded thereto at its lower end. The upper end of the tube 130 is similarly affixed to the closure member 118.

Within the jacket 128 are located several coil windings. The primary or exciting coil winding which is centrally disposed has been indicated by the reference numeral 134, whereas the secondary coil windings which serve as the output have been labeled 136, 138. Inasmuch as differential transformers are widely used, the action of such devices need not be explained. However, it can be pointed out that the secondary coil windings 136, 138 are connected in series opposition with each other.

The differential transformer assembly 122 additionally includes a magnetizable armature core 140 which is slidably disposed within the non-magnetic tube 130. The core 140 has connected thereto a non-magnetic stainless steel connecting link 142, the connection being by means of a pin 144. Connected to the upper end of the link 142 is a coupling 146. A pin 148 provides such connection. A pair of integral ears 150 on the clevis member 110 straddle the coupling 146. Through the agency of clevis pin 152, the coupling 146 is connected to the clevis member 110. Consequently, when the clevis member 110 is moved by spring action, it causes the armature core 140 to move in unison therewith.

Also, as is conventional with differential transformers, an A.-C. energizing source 154 is employed. This source is connected directly to the primary or excitation winding 134. On the other hand, the secondary or output windings 136, 138 are connected to a converter 156 which converts the derived or sensed signal to a form usable by a recorder 158 or other instrument capable of providing a recognizable indication.

The operation of my transmitter is believed readily apparent from what has been presented above. Assuming that the shaft 26 is in its lowermost position, which it will be when the mantle 30 is first used, the upper coil spring 108 will be compressed considerably within the tubular plunger 96. As the mantle 30 and ring concave 14 become worn, though, the mantle will have to be moved upwardly by increasing the pressure of the fluid beneath the piston clamp 40. As the piston 36 raises the mantle 30, the plunger 96 is free to follow the upward adjustment. Although the upward adjustment can be quite appreciable, and likewise the extent to which the spring 108 expands, nonetheless the expansion of the spring 116 under these circumstances will be quite small. Due to this, the core 140 will be moved only a small amount with respect to the coils 134, 136 and 138. This is so because the core 140 is directly connected to the clevis member 110, the movement of the clevis member 110 being influenced by the action of the springs 108 and 116.

Even though the movement of the core 140 is quite small, the voltage induced in the secondary coil windings 136, 138 will depend upon the particular position of the core 140 with respect thereto. For instance, when the core is at the center of the winding 134, balanced voltages will be induced in each of the second coil windings 136, 138. Under these particular conditions, the output to the converter 156 will be zero and hence the recorder 158 will record this condition. All that need be done is to calibrate the recorder 158, or what other instrument is used, with respect to the particular location of the core 140. The core 140, as will be understood, can be additionally displaced in a direction farther into the winding 138, passing upwardly through its null position as the mantle 30 is adjusted from time to time for wear that has occurred. Even though the mantle 30 will have to be adjusted through an appreciable distance, on the order of a total of a couple of feet, the movement of the core 140 will be considerably reduced and permits the employment of a differential transformer for providing a reliable indication of the position of the mantle 30 at all times.

It will, of course, be understood that various changes may be made in the form, details, arrangements and proportions of the parts without departing from the scope of my invention as set forth in the appended claims.

What is claimed:

1. A transmitter for indicating the position of a shiftable member comprising first and second resilient means disposed in series with each other, said first means being more resilient than said second means so as to be yieldable to a greater extent than said second means when acted upon by said member, a core element, and a coil element inductively associated with said core element, one of which elements is movable with respect to the other by said resilient means to provide an indication of the position of said member.

2. A transmitter for indicating the position of a shiftable member comprising a pair of coil springs disposed in series with each other and capable of deflecting different amounts for the same load, means for causing the end of the spring capable of greater deflection lying remote from the spring capable of lesser deflection to follow the movement of said shiftable member, and electrical means connected to the spring capable of lesser deflection for providing a voltage signal in accordance with the degree of compression thereof.

3. A transmitter in accordance with claim 2 in which said signal means includes a differential transformer.

4. A transmitter for indicating the position of a shiftable member comprising first and second coil spring means disposed in series with each other, said first spring means being capable of greater deflection for a given load than said second spring means and having the end thereof remote from said second spring means adapted to follow the movement of said shiftable member, means for preventing movement of the remote end of said second spring means, a core element, and a coil element inductively associated with said core element, one of said elements being connected to the end of said second spring means adjacent said first spring means, whereby any shifting of said member will cause a change in the degree of inductive coupling between said core and coil elements.

5. A transmitter for indicating the position of a piston within a hydraulic cylinder comprising a fluid-tight casing adapted to be attached to one end of said cylinder, a tubular plunger slidably disposed within said casing for engagement with said piston, a first coil spring of one strength contained within said tubular plunger and projecting from the end thereof opposite said piston, a second coil spring of greater strength contained within said casing, a member disposed intermediate said first and second springs against which the adjacent ends of said springs bear, a magnetizable core element connected to said intermediate member so as to be movable therewith, and coil means concentrically mounted with respect to said core element so as to provide an electrical signal in accordance with the position of said core element and hence the position of said piston.

6. A transmitter in accordance with claim 5 including a guide rod carried on said intermediate member, said guide rod projecting into said first spring.

7. A transmitter in accordance with claim 5 including a non-magnetizable sleeve fixedly mounted with respect to said casing in which said core element moves, said coil means being circumjacent said sleeve.

8. In combination, crushing apparatus comprising a housing, a tapered cone forming a space within the interior of the housing for the crushing of material, a hydraulic cylinder and reciprocable piston for adjusting the cone with respect to the housing; and a transmitter for indicating the position of the piston and hence said cone relative to the housing comprising a casing attached to the end of the cylinder opposite said cone, a plunger slidable in said casing, said cylinder end being provided with an opening so that said plunger projects into the cylinder for engagement with said piston, a first relatively long coil spring capable of a comparatively large amount of deflection for a given load, said first spring being disposed so that one end thereof is acted upon by said plunger, a second relatively short coil spring capable of a comparatively small amount of deflection for said given load, said springs being mounted in series, a member intermediate the adjacent ends of the springs, and means connected to said intermediate member for providing a signal in accordance with the position of said intermediate member and hence said piston and cone.

9. The combination in accordance with claim 8 in which said plunger is tubular and receives a portion of said first spring in its bore, said plunger having an opening providing communication between said cylinder and said bore, and means closing the end of said casing spaced from said cylinder, the other end of said second spring bearing against said closing means.

10. The combination in accordance with claim 9 in which said closing means includes a fixed non-magnetizable sleeve having one end in communication with said casing and the other end closed to prevent the escape of fluid, and in which said signal means includes a differential transformer having a magnetizable core reciprocably disposed in said tube and connected to said intermediate member, and a plurality of coils encircling said tube for providing said signal.

References Cited in the file of this patent

UNITED STATES PATENTS

| | | |
|---|---|---|
| 1,920,505 | Henney | Aug. 1, 1933 |
| 2,627,183 | Greenwood et al. | Feb. 3, 1953 |
| 2,667,309 | Becker | Jan. 26, 1954 |
| 2,715,680 | Tatel et al. | Aug. 16, 1955 |
| 2,922,971 | Jeglum | Jan. 26, 1960 |
| 2,941,732 | Cross et al. | June 21, 1960 |
| 3,133,706 | Mertz | May 19, 1964 |
| 3,133,707 | Zimmerman | May 19, 1964 |